United States Patent
Dwyer III

(10) Patent No.: US 6,418,442 B1
(45) Date of Patent: Jul. 9, 2002

(54) METHOD AND APPARATUS FOR PROVIDING THREAD-SPECIFIC COMPUTER SYSTEM PARAMETERS

(75) Inventor: Thomas J. Dwyer III, Sunyvale, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/345,107

(22) Filed: Jun. 29, 1999

(51) Int. Cl.[7] .............................................. G06F 17/00
(52) U.S. Cl. ..................... 707/100; 707/10; 709/102; 709/106
(58) Field of Search .............. 707/1–206; 709/100–332, 709/223–244, 319–320; 714/10–16

(56) References Cited

U.S. PATENT DOCUMENTS

| | | | |
|---|---|---|---|
| 5,432,926 A | * 7/1995 | Citron et al. | 714/15 |
| 5,598,562 A | * 1/1997 | Cutler et al. | 709/104 |
| 5,835,908 A | * 11/1998 | Bennett et al. | 707/10 |
| 5,899,990 A | * 5/1999 | Maritzen et al. | 707/103 |
| 6,002,872 A | * 12/1999 | Alexander III | 707/3 |
| 6,070,173 A | * 5/2000 | Huber et al. | 707/103 |

OTHER PUBLICATIONS

Bai et al., "Distributed end–to–end testing management", 2001, Enterprise Distributed Object Computing Conference, pp. 140–151, Proceedings, Fifth IEEE International, 2001.*
Berekovic et al., "A programmable co–processor for MPEG–4 video", 2001, Acoustics, Speech, and Signal Processing, pp. 1021–1024, Proceedings, IEEE International Conference on, vol. 2, 2001.*
Arcangeli et al., "An API for high–level software engineering of distributed and mobile applications", 2001, Future Trends of Distributed Computing Systems, pp. 155–161, FTCDS 2001, Proceedings, The Eighth IEEE Workshop on, 2001.*

* cited by examiner

*Primary Examiner*—David Jung
(74) *Attorney, Agent, or Firm*—Park, Vaughan & Fleming LLP

(57) ABSTRACT

The present invention provides a system that looks up thread-specific computer system parameters from a centralized repository. These thread-specific computer system parameters govern interactions between threads and components within a computer system. The system operates by receiving a request from a thread to look up a thread-specific computer system parameter. In response to this request, the system obtains a thread identifier associated with the thread, and uses the thread identifier to look up the thread-specific computer system parameter from the centralized repository of computer system parameters. Next, the system uses the thread-specific computer system parameter in performing an action for the thread related to operation of a computer system component. For example, the system may use the thread-specific computer system parameter to "power on" or "power off" a board within a server. In one embodiment of the present invention, the centralized repository includes a primary hash table that is indexed by thread identifier. In a variation on this embodiment, the centralized repository further comprises a plurality of secondary hash tables, wherein the plurality of secondary hash tables are referenced by entries in the primary hash table. These secondary hash tables are indexed by parameter type.

33 Claims, 3 Drawing Sheets

METHOD AND APPARATUS FOR PROVIDING THREAD-SPECIFIC COMPUTER SYSTEM PARAMETERS

BACKGROUND

1. Field of the Invention

The present invention relates to operating systems for computers. More specifically, the present invention relates to a method and apparatus for looking up thread-specific computer system parameters from a centralized repository.

2. Related Art

The recent proliferation of computer networks such as the Internet has lead to the development of computer languages, such as the JAVA™ programming language distributed by Sun Microsystems, Inc. of Palo Alto, Calif. (Sun, the Sun logo, Sun Microsystems, and Java are trademarks or registered trademarks of Sun Microsystems, Inc. in the United States and other countries.) The Java programming language supports execution of platform-independent Java bytecodes, which can be transported across a computer network, such as the Internet, to remote computer nodes. These remote computer nodes include a "Java virtual machine" that is able to execute the Java bytecodes.

Java virtual machines typically support multiple threads of execution, thereby allowing a number of different bytecodes to execute concurrently. Unfortunately, existing Java virtual machines do not maintain certain types of thread-specific computer system configuration information. For example, a Java virtual machine provides only a single "System.out" variable specifying an output stream for screen output. This single System.out variable cannot be used for multiple threads that want to direct output to different destinations. This can pose a problem in implementing certain applications, such a chat server that maintains a plurality of different threads to converse with a plurality of different connections. Such a system is not practical to implement using a single System.out variable.

What is needed is a method and apparatus that provides a generic interface that allows individual threads to keep track of thread-specific computer system parameters.

SUMMARY

One embodiment of the present invention provides a system that looks up thread-specific computer system parameters from a centralized repository. These thread-specific computer system parameters govern interactions between threads and components within a computer system. The system operates by receiving a request from a thread to look up a thread-specific computer system parameter. In response to this request, the system obtains a thread identifier associated with the thread, and uses the thread identifier to look up the thread-specific computer system parameter from the centralized repository of computer system parameters. Next, the system uses the thread-specific computer system parameter in performing an action for the thread related to operation of a computer system component. For example, the system may use the thread-specific computer system parameter to "power on" or "power off" a board within a server.

In one embodiment of the present invention, the centralized repository includes a primary hash table that is indexed by thread identifier. In a variation on this embodiment, the centralized repository further comprises a plurality of secondary hash tables, wherein the plurality of secondary hash tables are referenced by entries in the primary hash table. These secondary hash tables are indexed by parameter type.

The thread-specific computer system parameters stored in the centralized repository can specify a number of things. For example, a thread-specific computer system parameter can specify: an input stream through which the thread receives input; an output stream through which the thread directs output; a current directory location for the thread; or a credential that allows the thread to access hardware resources in the computer system.

One embodiment of the present invention operates within a service processor that supports a server running multiple instances of an operating system.

One embodiment of the present invention operates in concert with a Java virtual machine.

In one embodiment of the present invention, if the step of looking up the thread-specific computer system parameter fails, the system looks up the thread-specific computer system parameter using an identifier for a parent of the thread.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computing System

Figure 1:
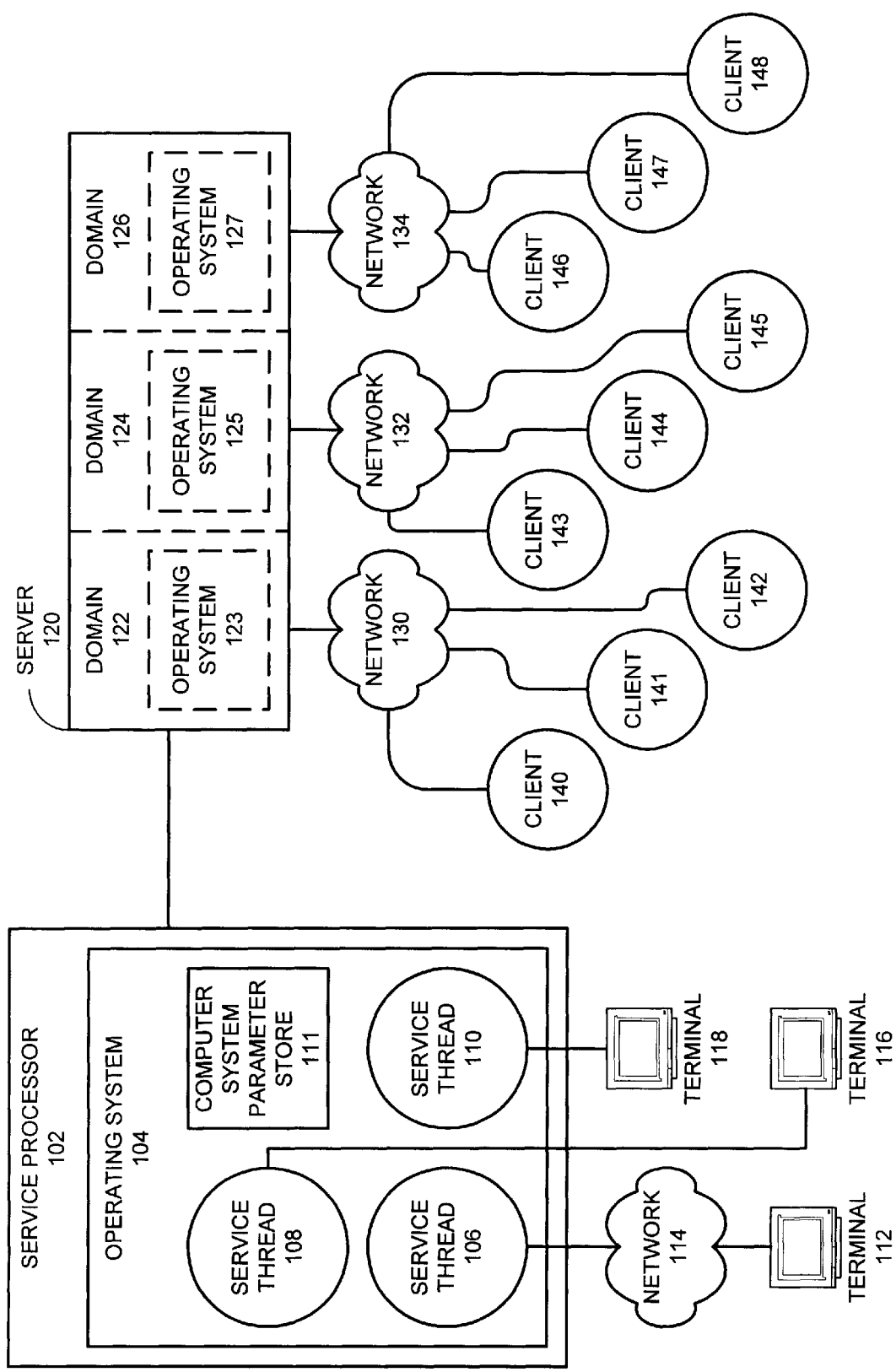
FIG. 1 illustrates a distributed computing system in accordance with an embodiment of the present invention.

FIG. 1 illustrates a distributed computing system in accordance with an embodiment of the present invention. The distributed computing system illustrated in FIG. 1 includes a server 120 coupled to a plurality of clients 140–148 through a plurality of networks 130, 132 and 134. Server 120 is additionally coupled to service processor 102, which is further coupled to terminals 112, 116 and 118.

Server 120 can include any device for servicing requests involving computational or data storage resources. As illustrated in FIG. 1, server 120 is partitioned into a plurality of configurable domains, including domains 122, 124 and 126. Each of these domains, 122, 124 and 126, runs a separate operating system image. More specifically domains 122, 124 and 126 run operating system images 123, 125 and 127, respectively. In one embodiment of the present invention operating system images 123, 125 and 127 include instances of the SOLARIS™ operating system distributed by SUN Microsystems, Inc. of Palo Alto, Calif.

Domains 122, 124 and 126 can be configured to use variable amounts of computational and/or data storage resources within server 120. If one domain becomes exceedingly busy, it is able to borrow computational and/or data storage resources from a less busy domain in a way that is transparent to computer system users. Also note that domains 122, 124 and 126 are insulated from each other so that actions in one domain do not affect other domains.

Clients 140–148 can include any network device that makes requests on a server for services involving computational or data storage resources. As mentioned above, clients 140–148 are coupled to server 120 through networks 130, 132 and 134. More specifically, clients 140–142 are coupled to server 120 through network 130; clients 143–145 are coupled to server 120 through network 132; and clients 146–148 are coupled to server 120 through network 134.

Networks 130, 132 and 134 may include any type of communication channels for carrying communications between server 120 and clients 140–148. This includes, but is not limited to, local area networks, such as Ethernet, and wide area networks, such as the Internet. Networks 130, 132 and 134 may also include networks that uses a fiber optic, electrical, infrared or radio wave communication mechanism. In one embodiment of the present invention, networks 130, 132 and 134 are portions of a single communication network.

Service processor 102 oversees the configuration and operation of server 120. Service processor 102 includes operating system 104. In one embodiment of the present invention, operating system 104 includes the Java operating system distributed by SUN Microsystems, Inc. of Palo Alto, Calif. In the embodiment illustrated in FIG. 1, operating system 104 contains a number of threads, including service threads 106, 108 and 110. Service threads 106, 108 and 110 communicate with terminals 112, 116 and 118, respectively. Note that service thread 106 communicates with terminal 112 through network 114. (Network 114 may include any type of communication channel for carrying communications between service processor 102 and terminal 112.)

Service threads 106, 108 and 110 run separate instances of a shell program that allow terminals 112, 116 and 118 to function as system consoles for domains 122, 124 and 126, respectively, within server 120. More specifically, service thread 106 runs a shell program that allows terminal 112 to act as a system console for domain 122, service thread 108 runs a shell program that allows terminal 116 to act as a system console for domain 124, and service thread 110 runs a shell program that allows terminal 118 to act as a system console for domain 126.

Operating system 104 also includes computer system parameter store 111. Computer system parameter store 111 is a centralized repository for thread-specific computer system parameters. One embodiment of computer system parameter store 111 is described below with reference to FIG. 2.

Hash Table

Figure 2:
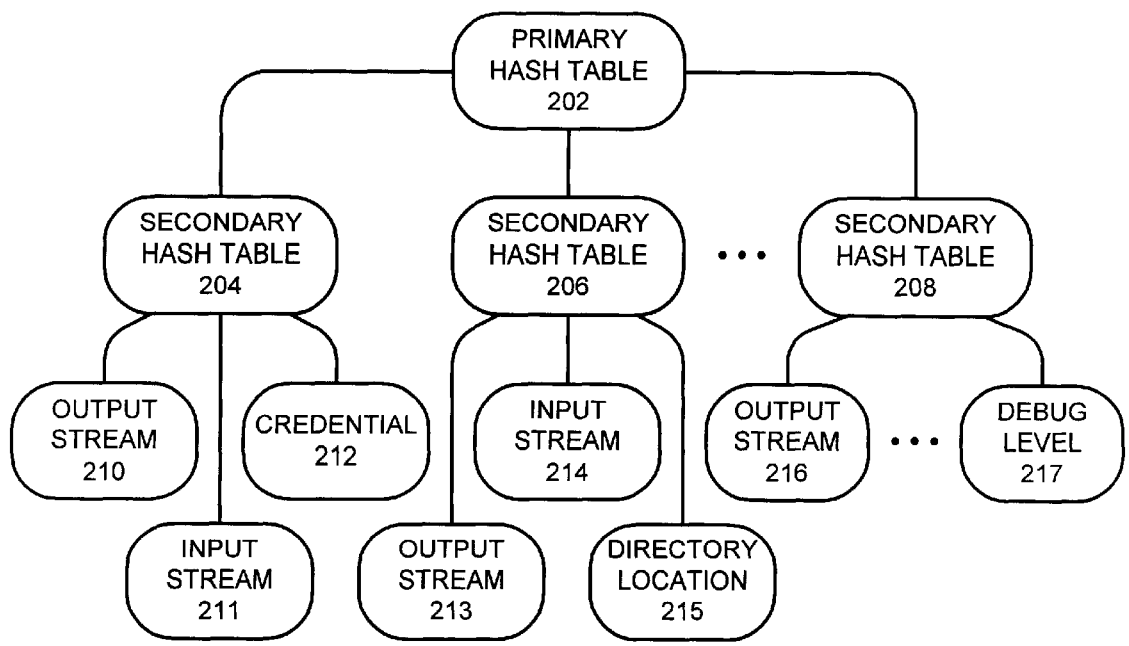
FIG. 2 illustrates a hash table of hash tables in accordance with an embodiment of the present invention.

FIG. 2 illustrates a hash table of hash tables that is used to implement computer system parameter store 111 from FIG. 1 in accordance with an embodiment of the present invention.

The data structure illustrated in FIG. 2 includes a primary hash table 202 that is indexed by thread identifier. Each entry within primary hash table 202 is a reference to a secondary hash table. More specifically, primary hash table 202 includes references to secondary hash tables 204, 206 and 208. Each secondary hash table is indexed by type of computer system parameter. Hence, in order to lookup a computer system parameter for a thread, the system first looks up a thread-specific hash table in primary hash table 202. This returns a thread-specific secondary hash table. Next, the system looks up the computer system parameter in the thread-specific secondary hash table.

In the example illustrated in FIG. 2, secondary hash table 204 contains a number of computer system parameters, including output stream 210, input stream 211 and credential 212. Output stream 210 specifies an output stream to which character output is directed for a specific thread. Similarly, input stream 211 specifies an input stream from which data input is received by the specific thread. Finally, credential 212 includes a credential for the specific thread that indicates the thread's rights over specific components within a computer system. For example, credential 212 may indicate that the service thread 106 from FIG. 1 has rights to activate certain processor boards within server 120 relating to domain 122. This type of credential system can be used to provide a certain amount of insulation between threads, by restricting certain threads to accessing a limited set of computer system components.

Similarly, secondary hash table 206 contains output stream 213, input stream 214 and directory location 215. Directory location 215 specifies a location in a directory structure for the thread. This is useful in navigating through a directory system. In one embodiment of the present invention, the directory structure is mapped on top of the hardware architecture for server 120 in FIG. 1. This allows an operator at a terminal to navigate into directories corresponding to individual boards within server 120, and then into individual chips within boards, and so on.

Secondary hash table 208 includes a number of computer system parameters, including output stream 213 and debug level 217. Debug level 217 specifies how much output is to be produced for debug purposes. If debug level 217 is very low, the thread produces terse debug output. If debug level 217 is very high, the thread produces verbose debug output.

Note that any number of different thread-specific computer system parameters can be stored within the indexing structure illustrated in FIG. 2. Also note that a hash table of hash tables is only one of a limitless number of possible lookup structures that can be used to implement computer system parameter store 111 from FIG. 1. In general, any lookup structure that is able to retrieve thread-specific computer system parameters based upon thread identifiers and parameter types can be used in place of the data structure illustrated in FIG. 2.

Operation of a Shell

Figure 3:
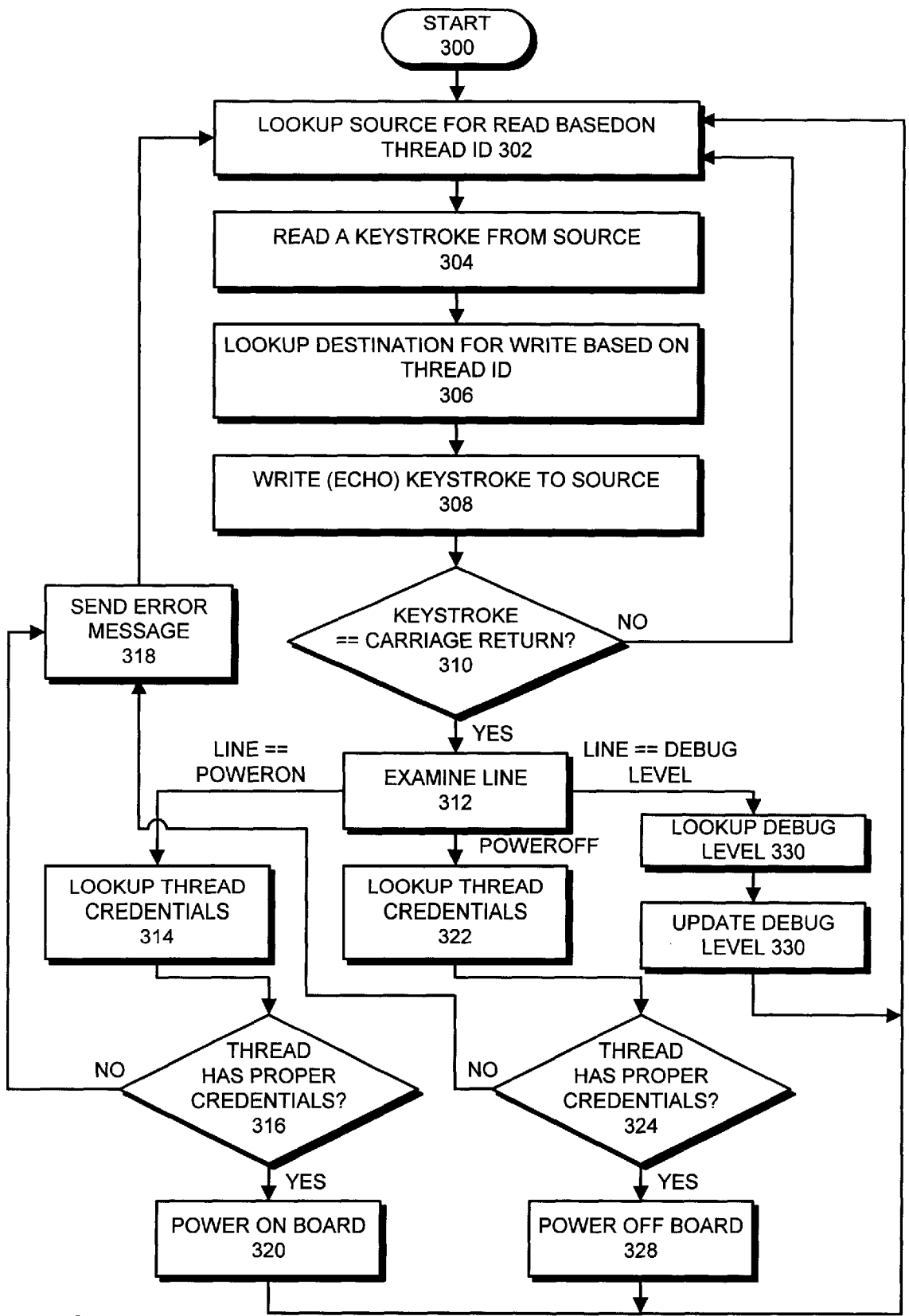
FIG. 3 is a flow chart illustrating the process of receiving and processing input within a shell in accordance with an embodiment of the present invention.

FIG. 3 is a flow chart illustrating the process of receiving and processing input within a shell program in accordance with an embodiment of the present invention. For example, a shell program running under service thread 106 can be used to receive input from terminal 112 to control domain 122 within server 120 (in FIG. 1).

The system starts by looking up a thread-specific input stream for character input based upon the thread identifier (step 302). This lookup can be accomplished by accessing the data structure illustrated in FIG. 2. Once the system identifies an input stream, the system reads a character from the input stream (step 304). Next, the system looks up an output stream for a write operation based on the thread identifier (step 306). Again, this lookup can be accomplished by accessing the data structure illustrated in FIG. 2. Once the system obtains a destination for the write operation, the system writes the keystroke to the destination (step 308). This "echoes" the character to a terminal screen so that the terminal operator can verify that the character was entered properly.

Next the system determines if the keystroke was a carriage return (step 310). If not, the system returns to step 302 to read another character.

If the keystroke is a carriage return, the system examines the line from the line buffer that is terminated by the carriage return (step 312). At this point, the system can branch to a number of different commands. Three exemplary commands are illustrated in FIG. 3.

If the line contains a "power on" command for a board within server 120, the system first looks up the thread's credentials to ensure that the thread has authority to power on the specified board (step 318). This lookup can be accomplished by accessing the data structure illustrated in FIG. 2. If the thread does not have proper authority, the system sends an error message (step 318), and returns to step 302 to get the next character. If the thread does have proper authority, the system powers on the specified board in server 120 (step 320), and returns to step 302 to get another character.

If the line contains a "power off" command for a board within server 120, the system first looks up the thread's credentials to ensure that the thread has authority to power on the specified board (step 322). Again, this lookup can be accomplished by accessing the data structure illustrated in FIG. 2. If the thread does not have proper authority, the system sends an error message (step 318), and returns to step 302 to get the next character. If the thread does have proper authority, the system powers off the specified board in server 120 (step 328), and returns to step 302 to get another character.

If the line contains a "debug level" command for the thread, the system first looks up the thread's debug level (step 329). This lookup can be accomplished by accessing the data structure illustrated in FIG. 2. Next, the system updates the debug level for the thread with a specified debug value (step 330. Finally, the system returns to step 302 to get another character.

Lookup Process

Figure 4:
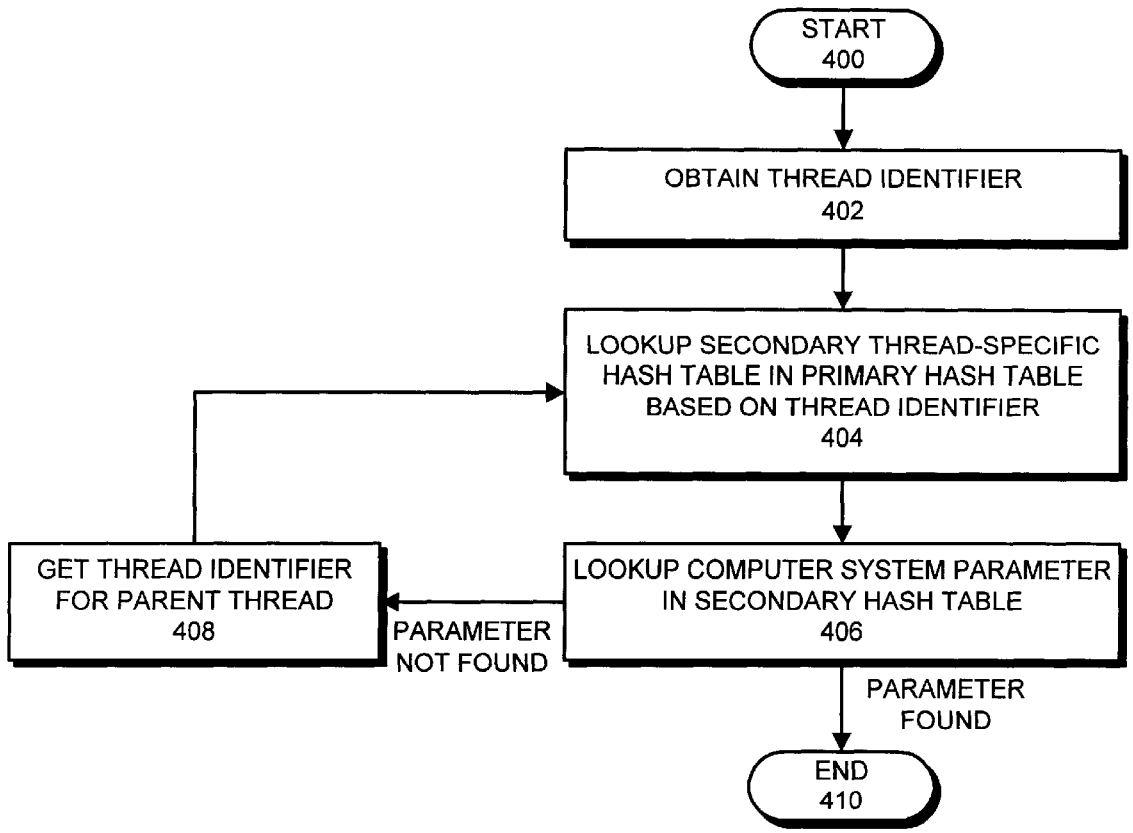
FIG. 4 is a flow chart illustrating the process of looking up a computer system parameter in accordance with an embodiment of the present invention.

FIG. 4 is a flow chart illustrating the process of looking up a computer system parameter in accordance with an embodiment of the present invention. The lookup process illustrated in FIG. 4 can be used to perform any one of the lookups discussed with reference to FIG. 3. For example, the process can be used to lookup an input stream, an output stream, a credential or a debug level for a thread.

First, the system obtains an identifier for the thread (step 402). This identifier may be received as a parameter to the lookup process, or the lookup process may probe an operating system data structure associated with the thread to obtain the thread identifier. Next, the system uses the thread identifier to lookup a thread-specific secondary hash table within primary hash table 202 in FIG. 2 (step 404). Once the secondary hash table is identified, the system looks up the specified computer system parameter in the secondary hash table (step 406). If the computer system parameter is found, the lookup is complete. Otherwise, the system retrieves an identifier for a parent thread of the original thread (step 408) and repeats the lookup process. If the lookup involving the parent thread is not successful, the system can proceed to the parent's parent, and so on, until a parameter is found. If no parent exists and step 408 fails, an "object not found" error is returned to the thread attempting the lookup. Looking up a parent's parameter in this way allows a thread to inherit computer system attributes from ancestor threads.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for looking up thread-specific computer system parameters from a centralized repository, the thread-specific computer system parameters governing interactions between threads and components within a computer system, the method comprising:

receiving a request to look up a thread-specific computer system parameter, the request being generated by a thread;

obtaining a thread identifier associated with the thread;

using the thread identifier to look up the thread-specific computer system parameter from the centralized repository of computer system parameters, wherein the centralized repository is separate from data structures maintained for individual threads; and using the thread-specific computer system parameter in performing an action for the thread related to operation of a computer system component;

whereby the computer system is able to use thread-specific computer system parameters that are not maintained in existing thread-specific data structures for the computer system.

2. The method of claim 1, wherein using the thread identifier to look up the thread-specific computer system parameter includes looking up the thread-specific computer system parameter in a first hash table using the thread identifier.

3. The method of claim 2, wherein looking up the thread-specific computer system parameter in the first hash table further comprises:

retrieving a reference to a second hash table from the first hash table; and retrieving the thread-specific computer system parameter from the second hash table.

4. The method of claim 1, wherein obtaining the thread identifier includes looking up the thread identifier in a data structure associated with the thread.

5. The method of claim 1, wherein the thread-specific computer system parameter specifies an input stream through which the thread receives input.

6. The method of claim 1, wherein the thread-specific computer system parameter specifies an output stream through which the thread directs output.

7. The method of claim 6, wherein performing the action for the thread includes outputting data from the thread through the output stream.

8. The method of claim 1, wherein the thread-specific computer system parameter includes a credential that allows the thread to access certain hardware resources in the computer system.

9. The method of claim 1, wherein the thread-specific computer system parameter includes a current directory location for the thread.

10. The method of claim 1, wherein performing the action for the thread includes performing the action within a service processor that supports a server running multiple instances of an operating system.

11. The method of claim 10, wherein performing the action for the thread includes one of, powering on a board in the server and powering off the board in the server.

12. The method of claim 1, wherein the thread operates within a Java Virtual Machine.

13. The method of claim 1, further comprising looking up the thread-specific computer system parameter using an identifier for a parent of the thread if the step of looking up the thread-specific computer system parameter fails.

14. An apparatus that facilitates looking up thread-specific computer system parameters, comprising:
  a centralized repository containing thread-specific computer system parameters governing interactions between threads and components within a computer system;
  an execution mechanism that executes program code for a thread, the execution mechanism being configured to receive a request to look up a thread-specific computer system parameter during execution of the program code; and
  a lookup mechanism that is configured to,
    obtain a thread identifier associated with the thread, and to use the thread identifier to look up the thread-specific computer system parameter from the centralized repository of computer system parameters, wherein the centralized repository is separate from data structures maintained for individual threads;
  wherein the execution mechanism is configured to use the thread-specific computer system parameter to perform an action for the thread related to operation of a computer system component;
  whereby the computer system is able to use thread-specific computer system parameters that are not maintained in existing thread-specific data structures for the computer system.

15. The apparatus of claim 14, further comprising a data structure associated with the thread which contains the thread identifier.

16. The apparatus of claim 14, wherein the centralized repository includes a primary hash table that is indexed by thread identifier.

17. The apparatus of claim 16, wherein the centralized repository further comprises a plurality of secondary hash tables, wherein the plurality of secondary hash tables are referenced by entries in the primary hash table.

18. The apparatus of claim 14, wherein the thread-specific computer system parameter specifies an input stream through which the thread receives input.

19. The apparatus of claim 14, wherein the thread-specific computer system parameter specifies an output stream through which the thread directs output.

20. The apparatus of claim 19, wherein the execution mechanism is configured to output data from the thread through the output stream.

21. The apparatus of claim 14, wherein the thread-specific computer system parameter includes a credential that allows the thread to access certain hardware resources in the computer system.

22. The apparatus of claim 14, wherein the thread-specific computer system parameter includes a current directory location for the thread.

23. The apparatus of claim 14, further comprising a service processor that supports a server running multiple instances of an operating system; and
  wherein the service processor includes the execution mechanism and the lookup mechanism.

24. The apparatus of claim 23, wherein the action for the thread includes one of, powering on a board in the server and powering off the board in the server.

25. The apparatus of claim 14, further comprising a Java Virtual Machine upon which the thread executes.

26. The apparatus of claim 14, wherein the lookup mechanism is further configured to look up the thread-specific computer system parameter using an identifier for a parent of the thread if the look up using the thread identifier fails.

27. A computer readable storage medium storing instructions that when executed by a computer cause the computer to perform a method for looking up thread-specific computer system parameters from a centralized repository, the thread-specific computer system parameters governing interactions between threads and components within a computer system, the method comprising:
  receiving a request to look up a thread-specific computer system parameter, the request being generated by a thread;
  obtaining a thread identifier associated with the thread;
  using the thread identifier to look up the thread-specific computer system parameter from the centralized repository of computer system parameters, wherein the centralized repository is separate from data structures maintained for individual threads; and
  using the thread-specific computer system parameter in performing an action for the thread related to operation of a computer system component;
  whereby the computer system is able to use thread-specific computer system parameters that are not maintained in existing thread-specific data structures for the computer system.

28. A computer readable storage medium containing a data structure for providing thread-specific computer system parameters, the data structure comprising:
  a centralized repository for storing thread-specific computer system parameters governing interactions between threads and components within a computer system, wherein the centralized repository is separate from data structures maintained for individual threads; and
  an indexing structure for looking up a computer system parameter using a thread identifier associated with a thread;
  whereby the computer system is able to use thread-specific computer system parameters that are not maintained in existing thread-specific data structures for the computer system.

29. The computer readable storage medium containing the data structure of claim 28, wherein the indexing structure includes a primary hash table that is indexed by thread identifier.

30. The computer readable storage medium containing the data structure of claim 29, wherein the indexing structure further comprises a plurality of secondary hash tables, wherein the plurality of secondary hash tables are referenced by entries in the primary hash table.

31. The computer readable storage medium containing the data structure of claim 28, wherein a thread-specific computer system parameter includes an output stream through which a thread directs output.

32. The computer readable storage medium containing the data structure of claim 28, wherein a thread-specific computer system parameter includes a credential that allows the thread to access certain hardware resources in the computer system.

33. The computer readable storage medium containing the data structure of claim 28, wherein a thread-specific computer system parameter includes a current directory location for the thread.

* * * * *